United States Patent [19]

Araujo

[11] Patent Number: 4,980,318

[45] Date of Patent: Dec. 25, 1990

[54] HIGH REFRACTIVE INDEX PHOTOCHROMIC GLASSES

[75] Inventor: Roger J. Araujo, Big Flats, N.Y.

[73] Assignee: Corning Incorporated, Corning, N.Y.

[21] Appl. No.: 349,693

[22] Filed: May 10, 1989

[51] Int. Cl.$^5$ .................. C03C 4/06; C03C 3/11; C03C 3/115; C03C 3/064

[52] U.S. Cl. .................. 501/13; 501/56; 501/58; 501/59; 501/77; 501/78; 501/79

[58] Field of Search .............. 501/13, 56, 58, 59, 501/77, 78, 79

[56] References Cited

U.S. PATENT DOCUMENTS

| | | | |
|---|---|---|---|
| 3,998,647 | 12/1976 | Yamashita et al. | 501/13 |
| 4,102,693 | 7/1978 | Owen et al. | 501/13 |
| 4,190,451 | 2/1980 | Hares et al. | 501/13 |
| 4,746,633 | 5/1988 | Mazeau et al. | 501/56 |

FOREIGN PATENT DOCUMENTS 0063790  11/1982  European Pat. Off. ............ 501/13

Primary Examiner—Mark L. Bell
Attorney, Agent, or Firm—Clinton S. Janes, Jr.

[57] ABSTRACT

This invention relates to photochromic glasses exhibiting refractive indices greater than 1.59, densities no higher than 3.1 g/cm$^3$, Abbe numbers of at least 40, weight losses no greater than 0.01 mg/cm$^2$ in the A.O. test, and which, when exposed to actinic radiation at room temperatures, darken to transmittances below 40% and fade at least 15 percentage points of transmittance after five minutes' removal from the actinic radiation.

5 Claims, No Drawings

HIGH REFRACTIVE INDEX PHOTOCHROMIC GLASSES

BACKGROUND OF THE INVENTION

Ophthalmic lenses have conventionally been prepared from glass compositions exhibiting a refractive index of 1.523. Lenses fashioned from such glasses having a high negative power are cosmetically unappealing, however, because of their very thick outside edges. The use of glasses with a higher index of refraction permits an increase in the radius of curvature of a lens and, as a consequence, a reduction in thickness of the lenses. Nevertheless, glasses with higher values of refractive index have found but limited use until recently, because the high index glasses previously available were prepared from compositions wherein the density increased so rapidly with increasing refractive index that the use of such glasses led to heavier lenses, resulting in discomfort to the wearer. Furthermore, an increase in refractive index frequently effects a substantial increase in the dispersion of the glass.

A number of new glass compositions containing large amounts of $TiO_2$ have been devised which yield a desirable combination of high refractive index and moderately low density. Such glasses have resulted in a dramatic increase in the use of high index glasses in the fabrication of ophthalmic lenses. The success of those glass compositions in the ophthalmic art has led to considerable research to develop photochromic glasses exhibiting refractive indices of at least 1.6.

By far the greatest number of commercially marketed, ophthalmic photochromic lenses have been prepared from silver halide crystal-containing, borosilicate-based glass compositions. Unfortunately, one cannot make a photochromic glass by merely adding silver and halides to any arbitrarily chosen recipe for producing a high index glass. For example, it is difficult to precipitate silver halides in a transparent borosilicate glass unless the composition contains a relatively high concentration of $B_2O_3$ and unless the ratio of modifiers to $B_2O_3$ is in the proper range. Hence, any of the materials which can alter the refractive index may influence this ratio and, consequently, the ease with which the silver-halide can be precipitated.

Previous research has demonstrated that substantial quantities of $Ta_2O_5$, $HfO_2$, $Nb_2O_5$ and $ZrO_2$ can be incorporated in the host glass composition to raise the refractive index without significant deleterious effect upon the photochromic behavior or the chemical durability of the glass. However, $Ta_2O_5$ and $HfO_2$ are not only exceedingly expensive, but also they raise the density of the glass significantly. $Nb_2O_5$ and $ZrO_2$ give rise to melting problems when included in high concentrations. If $TiO_2$ imparted no adverse effects to a photochromic glass, one could simply add enough $TiO_2$ to achieve the desired refractive index, because that approach would yield the lowest possible glass density compatible with any specified refractive index. Unfortunately, however, the rise in refractive index brought about through $TiO_2$ additions is accompanied with a yellow-brown color and a low Abbe number (a high level of dispersion). Moreover, too high concentrations of $TiO_2$ generate opacity in the presence of silver halides and also lead to a reduction in the darkening capability and fading rate of the glass.

$La_2O_3$ raises the refractive index of the glass, but hazards the development of phase separation therein and increases the density thereof. Alkaline earth metal oxides can be utilized to raise the refractive index of a glass, but the inclusion of substantial amounts has a detrimental effect upon the photochromic properties thereof. Lead appears to be able to enter the silver halide crystal and to depress the rate of fading dramatically, besides markedly increasing the density of the glass.

With those constraints in mind, the principal objective of the present invention was to develop glass compositions suitable for ophthalmic applications exhibiting good photochromic properties and a high index of refraction, but coupled with a relatively low density and high Abbe number.

A specific objective was to develop such glass compositions which would demonstrate a refractive index ($n_d$) of greater than 1.59, a density ($\rho$) no higher than 3.1 g/cm$^3$, and an Abbe number ($\gamma_d$) of at least 40; which darken to a transmittance below 40% when exposed to actinic radiation under standard solar simulation at room temperature and fade at least 15 percentage points of transmittance within five minutes after withdrawal from the actinic radiation provided by the solar simulation, and which are subject to a weight loss no greater than 0.01 mg/cm$^2$ of surface area when exposed to the standard American Optical chemical durability test.

A preferred objective was to develop such compositions which could be chemically strengthened through a conventional ion exchange treatment involving the exchange of larger alkali metal ions from an external source with small alkali metal ions in the glass surface, the exchange being carried out at temperatures no higher than the strain point of the glass.

SUMMARY OF THE INVENTION

I have found that those objectives can be achieved within a relatively narrow range of base alkali metal borosilicate lens glass compositions wherein the primary mechanism for raising the refractive index of the glass comprises a combination of $ZrO_2$ with high concentrations of $K_2O$ with, optionally, $Li_2O$, or with lower concentrations of $K_2O$ and with at least one alkaline earth oxide selected from the group of CaO, SrO, and BaO, with SrO being the most preferred. Because of that mechanism, the inclusion of well known agents for increasing the refractory index of glasses, such as $La_2O_3$, $Nb_2O_5$, and $TiO_2$, is not required, but they may be incorporated in small amounts, where desired, to enjoy their action on refractive index, but at levels below which their deleterious effects upon glass properties and/or structure are felt. In view of the adverse consequences which PbO exerts on the photochromic behavior of the glass, it will desirably be absent from the composition.

Accordingly, the base glass compositions operable in the present invention consist essentially, expressed in terms of cation percent on the oxide basis, of

| | | | | | |
|---|---|---|---|---|---|
| $SiO_2$ | 35–47 | $Nb_2O_5$ | 0–5 | SrO | 0–16 |
| $B_2O_3$ | 24–38 | $TiO_2$ | 0–7 | BaO | 0–8.5 |
| $ZrO_2$ | 2.5–8 | $La_2O_3$ | 0–3 | $Li_2O$ | 0–15 |
| $K_2O$ | 2–13 | ZnO | 0–3 | $Na_2O$ | 0–8 |
| $Al_2O_3$ | 0–8 | CaO | 0–8.5 | $Li_2O + Na_2O + K_2O$ | 2–27 | to which the "photochromic elements" Ag, Cl, Br, and CuO are added in weight percent in excess of 100 along with the optional inclusion of fluoride

| | | | |
|---|---|---|---|
| Ag | 0.15–0.4 | CuO | 0.005–0.05 |
| Cl | 0.3–0.65 | F | 0–0.6 |
| Br | 0.2–0.65 | | |

Although it is not mathematically possible to convert ranges in cation percent to exact ranges in weight percent, the following values represent approximations of the base glass compositions expressed in terms of weight percent.

| | | | | | |
|---|---|---|---|---|---|
| $SiO_2$ | 34–50 | $Nb_2O_5$ | 0–11 | SrO | 0–26 |
| $B_2O_3$ | 14–22 | $TiO_2$ | 0–10 | BaO | 0–24 |
| $ZrO_2$ | 6–15 | $La_2O_3$ | 0–7 | $Li_2O$ | 0–5 |
| $K_2O$ | 2–12 | ZnO | 0–4 | $Na_2O$ | 0–5 |
| $Al_2O_3$ | 0–8 | CaO | 0–9 | $Li_2O + Na_2O + K_2O$ | 2–15 |

In general, the operable limit of any particular component is a function of the other components present in the composition. For example, high levels of alkaline earth oxides can only be employed in compositions where the concentrations of alkali metal oxides are low. It has also been found that, for any given amount of alkali metal oxide, the largest quantities of alkaline earth oxides which can be incorporated into the compositions without causing a significant adverse effect upon the photochromic properties of the glasses are observed when the alkaline earth oxide is either SrO alone (typically about 7–16 cation percent) or a combination of CaO and BaO in approximately equal proportions on the cation basis. If either of the latter two oxides is used alone, the concentration thereof must be maintained at a relatively low level unless adjustments are made with respect to the amount of alkali metal oxide present and/or to a lesser extent with respect to the quantity of $B_2O_3$ in the composition.

Base glass compositions which cannot be chemically strengthened, but which not only satisfy the above-stated objectives of the present invention, but also demonstrate photochromic behavior much superior to the minimum requirements set forth in those objectives, consist essentially, expressed in terms of cation percent on the oxide basis, of

| | | | | | |
|---|---|---|---|---|---|
| $SiO_2$ | 39–42 | $Nb_2O_5$ | 0–3.5 | $CaO + SrO + BaO$ | 7–11 |
| $B_2O_3$ | 27.5–30 | $TiO_2$ | 2–5.5 | $Li_2O$ | 0–3 |
| $ZrO_2$ | 5.5–6.5 | CaO | 0–4.5 | $Na_2O$ | 0–3 |
| $K_2O$ | 4–9 | SrO | 0–11 | $Li_2O + Na_2O + K_2O$ | 7–9 |
| $Al_2O_3$ | 0–2.5 | BaO | 0–4.5 | | | to which the "photochromic elements" are added in weight percent in excess of 100 along with the optional inclusion of fluoride

| | | | |
|---|---|---|---|
| Ag | 0.2–0.35 | CuO | 0.010–0.017 |
| Cl | 0.3–0.6 | F | 0–0.2 |
| Br | 0.2–0.5 | | |

Again, approximations of those ranges expressed in terms of weight percent are set out below:

| | | | | | |
|---|---|---|---|---|---|
| SiO | 39–42 | $Nb_2O_5$ | 0–7.5 | $CaO + SrO + BaO$ | 13–26 |
| $B_2O_3$ | 17–19 | $TiO_2$ | 2.75–7 | $Li_2O$ | 0–1 |
| $ZrO_2$ | 11.5–14 | CaO | 0–4.5 | $Na_2O$ | 0–2.5 |
| $K_2O$ | 3–7 | SrO | 0–17 | $Li_2O + Na_2O + K_2O$ | 5–9 |
| $Al_2O_3$ | 0–2.5 | BaO | 0–12 | | |

Glass compositions which can be chemically strengthened through a conventional large alkali metal ion for a small alkali metal ion exchange reaction will contain a greater level of alkali metal oxide than the base glass compositions reported immediately above. Glasses which are sought to exhibit the highest transmittance without significant yellow-coloration will not only contain larger proportions of alkali metal oxides than the glass compositions recorded immediately above, but also will have lower alkaline earth oxide contents (desirably none) and lower levels of $TiO_2$. It has been found, however, that those chemically strengthenable glasses do not fade from the darkened state as rapidly as some of the glass encompassed within the composition intervals described immediately above.

Base glasses which can be chemically strengthened and which demonstrate relatively rapid fading rates consist essentially, expressed in terms of cation percent on the oxide basis, of

| | | | | | |
|---|---|---|---|---|---|
| $SiO_2$ | 39–42 | $Al_2O_3$ | 0–2.5 | $Na_2O$ | 0–5 |
| $B_2O_3$ | 24–30 | $Nb_2O_5$ | 3–4 | $Li_2O + Na_2O + K_2O$ | 20–27 |
| $ZrO_2$ | 2.5–4.5 | $TiO_2$ | 2–4 | $CaO + SrO + BaO$ | 0–3 |
| $K_2O$ | 4–12 | $Li_2O$ | 10–15 | | | to which the "photochromic elements" are added in weight percent in excess of 100.

| | | | |
|---|---|---|---|
| Ag | 0.15–0.3 | Br | 0.2–0.5 |
| Cl | 0.3–0.5 | CuO | 0.007–0.017 |

Yet again, approximations of those ranges expressed in terms of weight percent are set out below:

| | | | | | |
|---|---|---|---|---|---|
| SiO | 39–42 | $Al_2O_3$ | 0–2.5 | $Na_2O$ | 0–5 |
| $B_2O_3$ | 16–18 | $Nb_2O_5$ | 7.5–8.5 | $Li_2O + Na_2O + K_2O$ | 10–16 |
| $ZrO_2$ | 6.5–9 | $TiO_2$ | 2.5–6.5 | $CaO + SrO + BaO$ | 0–3 |
| $K_2O$ | 3.5–11 | $Li_2O$ | 3.5–6 | | |

PRIOR ART

U.S. Pat. No. 3,630,765 discloses the production of photochromic glasses exhibiting high indices of refraction through the presence of $Ta_2O_5$ in amounts of 10–50% by weight in alkali metal borosilicate base compositions containing silver halides.

U.S. Pat. No. 3,703,388 reports the preparation of photochromic glasses of high refractive indices consisting of lanthanum borate base compositions containing silver halides.

U.S. Pat. No. 3,999,996 describes the formation of photochromic glasses demonstrating high indices of refraction consisting of high lead (26–30% by weight) aluminoborosilicate host compositions containing silver halides.

U.S. Pat. No. 4,486,541 claims the manufacture of BaO-free, silver halide-containing photochromic glasses with high refractive indices consisting essentially, in weight percent, of 0.5–6% $Li_2O$, 6–12% $K_2O$, 2–24% alkaline earth oxides, 1.5–10% $ZrO_2$, 14.5–27% $B_2O_3$, 0.5–12% PbO, 0.5–8% $TiO_2$, and 32–47% $SiO_2$. Although the above composition intervals literally overlap in part the ranges of the present inventive glasses, the thrust of the patented glasses to secure high indices of refraction was quite different. Thus, the working examples provided in the patent rely heavily on the presence of PbO and/or $La_2O_3$ to raise the refractive index. In sharp contrast, the instant inventive glasses are preferably essentially free of PbO and rely principally on a combination of $ZrO_2$ plus high concentrations of $K_2O$ with, optionally, $Li_2O$, or with lower levels of $K_2O$ with CaO and/or SrO and/or BaO to achieve a high refractive index. None of the working examples recited in the patent had a composition coming within the ranges operable in the present invention.

U.S. Pat. No. 4,686,196 records the fabrication of silver halide-containing ophthalmic photochromic glass lenses exhibiting high indices of refraction consisting essentially, in weight percent, of 3–9% $Li_2O$, 3–12% MgO, 3.06–6.74% $TiO_2$, 2–11% $ZrO_2$, 2.28–8% $Nb_2O_5$, 11–18% $B_2O_3$, and 42–56% $SiO_2$. With the exception of the required inclusion of MgO, there is partial overlap between the composition intervals of the patent and the range of the present inventive glasses. Nevertheless, there is no suggestion of utilizing a combination of $ZrO_2$ plus CaO and/or SrO and/or BaO to raise the refractive index of the host glass. Even ignoring the presence of MgO, none of the working examples provided in the patent had a composition coming within the ranges of the instant inventive glasses.

U.S. application Ser. No. 07/281,637, filed Dec. 9, 1988 under the title HIGH INDEX PHOTOCHROMIC GLASSES, discloses silver halide-containing photochromic glasses with refractive indices higher than 1.585, Abbe numbers greater than 42, densities less than 2.80 $g/cm^3$, and liquidus viscosities greater than 200 poises wherein the base glasses consist essentially, in weight percent, of:

| | | | |
|---|---|---|---|
| $SiO_2$ | 33–50 | MgO | 0–5 |
| $B_2O_3$ | 15–25 | CaO | 0–5 |
| $SiO_2 + B_2O_3$ | 58–66 | SrO | 0–10 |
| $Al_2O_3$ | 2–9 | BaO | 0–10 |
| $ZrO_2$ | 1–5 | ZnO | 0–5 |
| $Al_2O_3 + ZrO_2$ | 4–10 | $MgO + CaO + SrO + BaO + ZnO$ | 1–15(XO) |
| $Li_2O$ | 1.5–6 | $X_2O + XO$ | 10–24 |
| $Na_2O$ | 0–4 | $La_2O_3$ | 0–5 |
| $K_2O$ | 2–9 | $Nb_2O_5$ | 8–16 |
| $Li_2O + Na_2O + K_2O$ | 7–16($X_2O$) | $TiO_2$ | 2–8 |
| $Li_2O/X_2O$ | 0.20–0.50 | $ZrO_2 + TiO_2 + Nb_2O_5 + La_2O_3$ | 14–23 | base glass composition, the amounts thereof are merely reported in terms of Cl and Br in accordance with conventional glass analysis practice. Also, inasmuch as the level of silver in the glass is very small, it is simply recited as Ag.

The batch ingredients were compounded, ballmilled together to assist in obtaining a homogeneous melt, and charged into platinum crucibles. The crucibles were covered, introduced into a furnace operating at a temperature between about 1350°–1450° C., and maintained therein for a sufficient length of time to yield homogeneous melts (customarily about 3–6 hours). The crucible covers were removed, the melts stirred, and thereafter poured into steel molds to produce glass slabs having the dimensions of about $8'' \times 4'' \times 0.5''$ ($\approx 20 \times 10 \times 1.3$ cm) which were immediately transferred to an annealer operating at about 550°–600° C.

Although the above description reflects laboratory melting and forming only, it will be appreciated that the inventive glasses are capable of being melted in large scale melting units and shaped into articles of desired configurations utilizing techniques conventional in the glassmaking art. Hence, in accordance with standard glass melting and forming practice, it is only necessary that the batch materials be thoroughly mixed together, that batch then melted at temperatures and for times sufficient to assure a homogeneous melt, that melt thereafter cooled and simultaneously shaped into a glass body of a desired geometry, and that glass shape will normally be annealed.

TABLE I

| (Cation %) | 1 | 2 | 3 | 4 | 5 | 6 | 7 |
|---|---|---|---|---|---|---|---|
| $SiO_2$ | 36.0 | 36.0 | 36.5 | 36.5 | 38.5 | 40.0 | 41.5 |
| $B_2O_3$ | 35.0 | 37.0 | 37.5 | 34.9 | 29.8 | 32.3 | 28.8 |
| $ZrO_2$ | 4.0 | 5.0 | 7.5 | 5.5 | 5.0 | 7.5 | 6.0 |
| $K_2O$ | 3.0 | 3.0 | 4.5 | 4.5 | 4.5 | 6.0 | 8.0 |
| $Al_2O_3$ | 3.0 | 2.0 | 2.5 | 2.5 | — | 2.5 | — |
| $TiO_2$ | — | — | — | — | 4.0 | 3.0 | 5.0 |
| $La_2O_3$ | — | — | — | 2.5 | — | — | — |
| CaO | 9.5 | 8.5 | — | — | — | — | — |
| SrO | — | — | 14.0 | 14.1 | 15.7 | 10.7 | 8.2 |
| BaO | 9.5 | 8.5 | — | — | — | — | — |
| $Li_2O$ | — | — | — | — | — | — | — |

DESCRIPTION OF PREFERRED EMBODIMENTS

Table I records a group of base glass compositions, expressed in terms of cation percent on the oxide basis, illustrating the parameters of the present invention. Table IA reports that group of glass compositions plus the "photochromic elements" in terms of parts by weight on the oxide basis. Inasmuch as the sum of the components in each composition listed in Table IA closely approximates 100, for all practical purposes the individual values tabulated therein may be deemed to represent weight percent. The actual batch ingredients may be any materials, either an oxide or other compound, which, when melted together with the remainder of the batch, will be converted into the desired oxide in the proper proportions. For example, $Li_2CO_3$ and $SrCO_3$ may comprise the source of $Li_2O$ and SrO, respectively. Because it is not known with which cation(s) the chloride and bromide are combined in the

| | 8 | 9 | 10 | 11 | 12 | 13 | 14 |
|---|---|---|---|---|---|---|---|
| $SiO_2$ | 45.5 | 38.0 | 41.5 | 39.0 | 38.5 | 42.0 | 42.0 |
| $B_2O_3$ | 28.3 | 26.6 | 28.8 | 28.8 | 31.8 | 32.0 | 26.2 |
| $ZrO_2$ | 3.5 | 3.5 | 6.0 | 6.0 | 5.7 | 4.0 | 3.5 |
| $K_2O$ | 8.0 | 8.0 | 8.0 | 8.0 | 8.0 | 7.8 | 8.0 |
| $Al_2O_3$ | 0.5 | 8.0 | 2.5 | 2.5 | 2.8 | — | 4.0 |
| $Nb_2O_5$ | — | — | — | — | — | 3.5 | — |
| $TiO_2$ | 5.5 | 5.5 | 5.0 | 7.5 | 5.0 | 2.2 | 5.5 |
| SrO | 8.6 | 10.4 | 8.2 | 8.2 | 8.2 | 8.5 | — |
| ZnO | — | — | — | — | — | — | 2.5 |
| CaO | — | — | — | — | — | — | 2.9 |
| BaO | — | — | — | — | — | — | 5.4 |

| | 15 | 16 | 17 | 18 | 19 | 20 | 21 |
|---|---|---|---|---|---|---|---|
| $SiO_2$ | 40.0 | 40.0 | 39.0 | 40.0 | 40.0 | 40.0 | 40.0 |

TABLE I-continued

| | (Cation %) | | | | | | |
|---|---|---|---|---|---|---|---|
| B₂O₃ | 25.0 | 25.0 | 28.0 | 25.0 | 24.5 | 25.0 | 24.9 |
| ZrO₂ | 2.7 | 3.0 | 3.5 | 3.0 | 3.2 | 3.0 | 2.7 |
| K₂O | 12.4 | 2.5 | 8.5 | 2.5 | 12.9 | 5.0 | 12.0 |
| Al₂O₃ | — | — | 0.5 | — | — | — | — |
| Nb₂O₅ | 3.5 | 3.0 | — | 3.0 | 4.0 | 3.0 | 3.5 |
| TiO₂ | 2.5 | 4.0 | 4.0 | 4.0 | 3.0 | 4.0 | 4.0 |
| PbO | 1.5 | — | — | — | — | — | — |
| La₂O₃ | — | — | 3.0 | — | — | — | — |
| Li₂O | 12.4 | 15.0 | 13.5 | 15.0 | 12.4 | 12.5 | 12.8 |
| Na₂O | — | 7.5 | — | 7.5 | — | 7.5 | — |

TABLE IA

| | (Weight %) | | | | | | |
|---|---|---|---|---|---|---|---|
| | 1 | 2 | 3 | 4 | 5 | 6 | 7 |
| SiO₂ | 34.8 | 35.5 | 35.5 | 34.7 | 36.4 | 38.7 | 41.1 |
| B₂O₃ | 19.6 | 21.2 | 21.1 | 19.2 | 16.4 | 18.1 | 16.5 |
| ZrO₂ | 7.92 | 10.1 | 14.9 | 9.74 | 9.71 | 14.9 | 12.2 |
| K₂O | 2.27 | 2.32 | 3.43 | 3.35 | 3.34 | 4.56 | 6.21 |
| Al₂O₃ | 2.46 | 1.67 | — | 2.02 | 2.01 | — | 2.10 |
| TiO₂ | — | — | — | — | 5.03 | 3.86 | 6.59 |
| La₂O₃ | — | — | — | 6.44 | — | — | — |
| PbO | — | — | — | — | — | — | — |
| CaO | 8.56 | 7.82 | — | — | — | — | — |
| SrO | — | — | 23.5 | 23.0 | 25.6 | 17.8 | 14.0 |
| BaO | 23.4 | 21.4 | — | — | — | — | — |
| Li₂O | — | — | — | — | — | — | — |
| Ag | 0.24 | 0.24 | 0.335 | 0.336 | 0.33 | 0.35 | 0.30 |
| Cl | 0.48 | 0.49 | 0.48 | 0.48 | 0.48 | 0.50 | 0.50 |
| Br | 0.48 | 0.49 | 0.48 | 0.48 | 0.48 | 0.50 | 0.50 |
| CuO | 0.024 | 0.25 | 0.024 | 0.029 | 0.042 | 0.035 | 0.015 |
| F | 0.48 | 0.49 | 0.48 | 0.48 | 0.48 | 0.50 | — |

| | 8 | 9 | 10 | 11 | 12 | 13 | 14 |
|---|---|---|---|---|---|---|---|
| SiO₂ | 45.8 | 37.9 | 40.7 | 37.9 | 38.8 | 41.4 | 41.2 |
| B₂O₃ | 16.5 | 15.4 | 16.4 | 16.2 | 18.6 | 18.3 | 14.9 |
| ZrO₂ | 7.23 | 7.16 | 12.1 | 12.0 | 11.8 | 8.08 | 7.0 |
| K₂O | 6.32 | 6.26 | 6.16 | 6.11 | 6.32 | 6.03 | 6.16 |
| Al₂O₃ | 0.43 | 6.78 | 2.08 | 2.07 | 2.39 | — | 3.33 |
| Nb₂O₅ | — | — | — | — | — | 7.63 | — |
| TiO₂ | 7.37 | 7.30 | 6.53 | 9.71 | 6.71 | 2.88 | 7.18 |
| SrO | 15.0 | 17.9 | 13.9 | 13.8 | 14.3 | 14.4 | — |
| ZnO | — | — | — | — | — | — | 3.32 |
| CaO | — | — | — | — | — | — | 2.66 |
| BaO | — | — | — | — | — | — | 13.5 |
| Ag | 0.30 | 0.30 | 0.29 | 0.29 | 0.25 | 0.22 | 0.24 |
| Cl | 0.50 | 0.50 | 0.49 | 0.49 | 0.45 | 0.49 | 0.39 |
| Br | 0.50 | 0.50 | 0.49 | 0.49 | 0.40 | 0.49 | 0.24 |
| CuO | 0.02 | 0.02 | 0.01 | 0.01 | 0.007 | 0.01 | 0.02 |
| *Er₂O₃ | — | — | 1.0 | 1.0 | — | — | — |
| *Co₃O₄ | — | — | — | — | 0.015 | — | — |
| *Colorants | | | | | | | |

| | 15 | 16 | 17 | 18 | 19 | 20 | 21 |
|---|---|---|---|---|---|---|---|
| SiO₂ | 44.2 | 48.1 | 45.0 | 48.2 | 45.5 | 47.7 | 46.0 |
| B₂O₃ | 16.0 | 17.4 | 18.7 | 17.5 | 16.2 | 17.3 | 16.6 |
| ZrO₂ | 6.12 | 7.40 | 8.27 | 7.42 | 7.47 | 7.33 | 6.36 |
| K₂O | 10.7 | 2.36 | 7.68 | 2.37 | 11.5 | 4.67 | 10.8 |
| Al₂O₃ | — | — | 0.49 | — | — | — | — |
| Nb₂O₅ | 8.55 | 7.98 | — | 8.00 | 10.07 | 7.91 | 8.89 |
| TiO₂ | 3.67 | 6.39 | 6.13 | 6.42 | 4.54 | 6.34 | 6.10 |
| PbO | 6.15 | — | — | — | — | — | — |
| La₂O₃ | — | — | 9.38 | — | — | — | — |
| Li₂O | 3.41 | 4.48 | 3.87 | 4.5 | 3.51 | 3.70 | 3.66 |
| Na₂O | — | 4.65 | — | 4.66 | — | 4.61 | — |
| Ag | 0.16 | 0.16 | 0.17 | 0.17 | 0.17 | 0.164 | 0.175 |
| Cl | 0.55 | 0.55 | 0.58 | 0.40 | 0.57 | 0.40 | 0.376 |
| Br | 0.55 | 0.55 | 0.49 | 0.40 | 0.57 | 0.40 | 0.279 |
| CuO | 0.013 | 0.018 | 0.014 | 0.013 | 0.019 | 0.015 | 0.010 |

As can be observed in the above Tables, Examples 1–14 illustrate glass compositions utilizing a combination of K₂O and alkaline earth metal oxides, principally SrO, in conjunction with ZrO₂ as the main components to raise the refractive index, whereas Examples 15–21 reflect a combination of K₂O and other alkali metal oxides, principally Li₂O, in conjunction with ZrO₂.

Table II records values of refractive index ($n_d$), density ($\rho$), and Abbe number ($\gamma_d$) determined in accordance with conventional measuring techniques. Table II also reports the results obtained with the glasses were subjected to the American Optical (A.O.) test. The A.O. test consists in measuring the loss of weight expressed in terms of mg/cm² experienced by a glass sample after being immersed in an aqueous 10% by weight HCl solution for 10 minutes at 25° C. The test method is described in detail in *Applied Optics*, 7, No. 5, page 847, May 1968. Finally Table II recites photochromic properties exhibited by flat plates of the glasses which had been ground and polished to a thickness of about 2 mm. The development of silver halide crystals was effected by inserting the glass slabs into a furnace operating at 725° C., retaining the slabs within the furnace for one hour, and then removing the slabs from the furnace and allowing them to cool under insulation. Thereafter, the slabs were re-annealed at about 550°–600° C. The photochromic properties were determined utilizing the solar simulator apparatus described in U.S. Pat. No. 4,125,775.

Basically, that apparatus comprises a 150 watt xenon arc source fitted with a filter to modify the spectral output thereof so as to closely approximate the solar spectrum, especially in the ultraviolet, blue, and red portions. The infrared region of the spectrum is attenuated with a layer of water of sufficient thickness to provide equal irradiance to that of the sun, but without great concern for its spectral distribution in that region.

The intensity of the arc source was adjusted such that the amount of darkening was identical to that of a number of commercially-available photochromic glasses (control glasses) darkened outdoors at noon during a cloudless early summer day in Corning, N.Y., the air mass value being about 1.06. In order to continuously monitor the darkened transmittance of the specimens, each sample was interrogated with a chopped beam of light from a tungsten-halogen lamp detected by a PIN silicon photodiode whose output was demodulated by a lock-in amplifier. A composite color filter was placed into the beam to approximate to the luminous response of the human eye under Illuminant C, as defined by C.I.E.

In Table II, $T_0$ is the initial transmittance of the specimen; $T_{10}$ is the transmittance of the specimen after a 10-minute exposure in the solar simulator at about 25° C.; and $T_{F5}$ is the transmittance of the specimen after being removed from the solar simulator for five minutes. Hence, the increase in transmittance between the values of $T_{10}$ and $T_{F5}$ illustrates the rate of fading of the glasses.

strates the dramatic decrease in rate of fading suffered by the inventive glasses when PbO is included in the compositions.

Examples 10, 11, and 12 illustrate that conventional glass colorants such as CoO and $Er_2O_3$ can be incorporated in customary amounts without significant impact upon the photochromic behavior exhibited by the inventive glasses. Inasmuch as the slight yellow coloration observed in the inventive glasses is sometimes considered undesirable, CoO and $Er_2O_3$ can beneficially be utilized to impart a neutral gray color to the glass.

To illustrate the capability of the inventive glasses containing a high alkali metal oxide content to be chemically strengthened, bars having the dimensions of $4''\times0.25''\times0.25''$ ($\approx 10\times0.63\times0.63$ cm) were cut from Examples 15–21 and immersed for 16 hours in a bath of molten mixture of 60% by weight $KNO_3$ and 40% by weight $NaNO_3$ operating at 390° C. to cause an exchange of $Na^+$ ions for $Li^+$ ions on the surface of the bars. After withdrawing the bars from the bath of molten salt, washing off the salt with tap water, and drying, an average modulus of rupture ranging between about 30,000–60,000 psi was measured on the bars with an average depth of ion exchanged layer of about 0.0032" ($\approx 0.08$ mm). Such values compare very favorably with those exhibited by PHOTOGRAY EXTRA ®, a commercial ophthalmic photochromic glass marketed by Corning Glass Works, Corning, N.Y., having a composition within U.S. Pat. No. 4,190,451. Those lenses demonstrate modulus of rupture values of about 30,000 psi and depth of layers of about 0.0029" ($\approx 0.07$ mm).

Example 7 comprises the most preferred embodiment of the inventive glasses where superior photochromic properties are desired and chemical strengthening of the glass is not sought. From an overall view of chemical

TABLE II

| | 1 | 2 | 3 | 4 | 5 | 6 | 7 | 8 | 9 | 10 |
|---|---|---|---|---|---|---|---|---|---|---|
| $n_d$ | 1.6015 | 1.5983 | 1.5966 | 1.5968 | 1.6142 | 1.604 | 1.6017 | 1.5994 | — | — |
| $v_d$ | 56.5 | 57.3 | 54.9 | 56.4 | 47.4 | — | — | 46.7 | — | — |
| $\rho$ | 3.077 | 3.02 | 3.004 | 3.066 | 3.072 | 2.927 | 2.827 | 2.853 | — | — |
| A.O. | — | — | 0.03 | 0.06 | 0.06 | 0.01 | <0.01 | — | — | — |
| $T_o$ | 88 | — | 81 | 87 | 86 | 82 | 88.7 | 89 | 86 | 85 |
| $T_{10}$ | 17 | — | 23 | 16 | 14 | 39 | 22.5 | 23 | 34 | 27 |
| $T_{F5}$ | 28 | — | 47 | 36 | 34 | 69 | 65.6 | 51 | 66 | 62 |
| $T_{F5}-T_{10}$ | 11 | — | 24 | 20 | 20 | 30 | 43.1 | 28 | 32 | 35 |

| | 11 | 12 | 13 | 14 | 15 | 16 | 17 | 18 | 19 | 20 | 21 |
|---|---|---|---|---|---|---|---|---|---|---|---|
| $n_d$ | — | — | — | 1.6019 | 1.6055 | 1.6091 | — | — | 1.6021 | — | 1.601 |
| $v_d$ | — | — | — | 44.5 | 43.2 | 42.7 | — | — | 43.3 | — | 42.5 |
| $\rho$ | — | — | — | 2.875 | 2.753 | 2.656 | — | — | 2.650 | — | — |
| A.O. | — | — | — | 0.02 | <0.01 | <0.01 | — | — | <0.01 | — | — |
| $T_o$ | 69 | 73 | 89 | 80 | 87 | 88 | 90 | 88 | 89 | 90 | 90 |
| $T_{10}$ | 24 | 18 | 35 | 16 | 8 | 54 | 60 | 47 | 24 | 40 | 46 |
| $T_{F5}$ | 52 | 48 | 66 | 32 | 13 | 75 | 77 | 69 | 59 | 63 | 22 |
| $T_{F5}-T_{10}$ | 28 | 30 | 31 | 16 | 5 | 21 | 17 | 22 | 35 | 23 | 24 |

As was observed above, the presence of $La_2O_3$ frequently gives rise to opalization in photochromic glasses. Examples 4 and 17, however, indicate that small amounts of $La_2O_3$ can be included in the inventive glasses without impairing the transparency thereof with or without the presence of alkaline earth oxides. ZnO likewise often leads to opalization in photochromic glasses. Nevertheless, Example 14 illustrates that a small amount of ZnO can substitute for a like amount of alkaline earth oxide with no significant adverse effect. As explained previously, $TiO_2$ yields the smallest increase in density for any given increase in glass density. Example 11, however, points out that to assure glass transparency the level of $TiO_2$ in the present incentive glass must be kept below 7.5 cation %. Example 15 demonstrengthenability (an average modulus of rupture of about 35,000 psi) and photochromic properties, Example 21 is deemed to be the most preferred glass.

I claim:

1. A photochromic glass exhibiting a refractive index greater than 1.59, a density no higher than 3.1 g/cm³, an Abbe number of at least 40, a weight loss no greater than 0.01 mg/cm² in the A.O. test, and which, when exposed to actinic radiation at room temperature, darkens to a transmittance below 40% and fades at least 15 percentage points of transmittance within five minutes after removal from the actinic radiation, said glass being essentially free of PbO and consisting essentially, expressed in terms of cation percent on the oxide basis, of

| SiO$_2$ | 35–47 | Nb$_2$O$_5$ | 0–5 | SrO | 0–16 |
|---|---|---|---|---|---|
| B$_2$O$_3$ | 24–38 | TiO$_2$ | 0–7 | BaO | 0–8.5 |
| ZrO$_2$ | 2.5–8 | La$_2$O$_3$ | 0–3 | Li$_2$O | 0–15 |
| K$_2$O | 2–13 | ZnO | 0–3 | Na$_2$O | 0–8 |
| Al$_2$O$_3$ | 0–8 | CaO | 0–8.5 | Li$_2$O + Na$_2$O + K$_2$O | 2–27 | to which Ag, Cl, Br, CuO, and optionally F are added in weight percent in excess of 100

| Ag | 0.15–0.4 | CuO | 0.005–0.05 |
|---|---|---|---|
| Cl | 0.3–0.65 | F | 0–0.6 |
| Br | 0.2–0.65. | | |

2. A photochromic glass according to claim 1 wherein said CaO and BaO are present in approximately equal proportions.

3. A photochromic glass according to claim 1 which cannot be chemically strengthened through an ion exchange reaction consisting essentially of

| SiO$_2$ | 39–42 | Nb$_2$O$_5$ | 0–3.5 | CaO + SrO + BaO | 7–11 |
|---|---|---|---|---|---|
| B$_2$O$_3$ | 27.5–30 | TiO$_2$ | 2–5.5 | Li$_2$O | 0–3 |
| ZrO$_2$ | 5.5–6.5 | CaO | 0–4.5 | Na$_2$O | 0–3 |
| K$_2$O | 4–9 | SrO | 0–11 | Li$_2$O + Na$_2$O + K$_2$O | 7–9 |
| Al$_2$O$_3$ | 0–2.5 | BaO | 0–4.5 | | | to which Ag, Cl, Br, CuO, and optionally F are added in weight percent in excess of 100

| Ag | 0.2–0.35 | CuO | 0.010–0.017 |
|---|---|---|---|
| Cl | 0.3–0.6 | F | 0–0.2 |
| Br | 0.2–0.5. | | |

4. A photochromic glass according to claim 3 wherein said CaO and BaO are present in approximately equal proportions.

5. A photochromic glass according to claim 1 which can be chemically strengthened through an ion exchange reaction consisting essentially of

| SiO$_2$ | 39–42 | Al$_2$O$_3$ | 0–2.5 | Na$_2$O | 0–5 |
|---|---|---|---|---|---|
| B$_2$O$_3$ | 24–30 | Nb$_2$O$_5$ | 3–4 | Li$_2$O + Na$_2$O + K$_2$O | 20–27 |
| ZrO$_2$ | 2.5–4.5 | TiO$_2$ | 2–4 | CaO + SrO + BaO | 0–3 |
| K$_2$O | 4–12 | Li$_2$O | 10–15 | | | to which Ag, Cl, Br, and CuO are added in weight percent in excess of 100

| Ag | 0.15–0.3 | Br | 0.2–0.5 |
|---|---|---|---|
| Cl | 0.3–0.5 | CuO | 0.007–0.017 |

* * * * *